United States Patent
Petry-Johnson et al.

(10) Patent No.: US 8,677,973 B2
(45) Date of Patent: Mar. 25, 2014

(54) THRUST PLATE FOR AN INTERNAL COMBUSTION ENGINE AND METHOD OF OPERATING SAME

(75) Inventors: Travis T. Petry-Johnson, Peoria, IL (US); Christian Earl Sabotta, East Peoria, IL (US); Michael Patrick Harmon, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 235 days.

(21) Appl. No.: 13/106,182

(22) Filed: May 12, 2011

(65) Prior Publication Data

US 2012/0285414 A1  Nov. 15, 2012

(51) Int. Cl.
- *F01M 3/04* (2006.01)
- *F01M 11/03* (2006.01)
- *F01M 1/04* (2006.01)
- *F01M 5/00* (2006.01)
- *F01M 11/10* (2006.01)
- *F01L 5/04* (2006.01)
- *F02B 61/04* (2006.01)

(52) U.S. Cl.
USPC ............. 123/196 R; 123/196 A; 123/196 CP; 123/196 AB; 123/196 M; 123/196 S; 123/196 V; 123/196 W

(58) Field of Classification Search
USPC ............. 123/196 R, 196 A, 196 CP, 196 AB, 123/196 M, 196 S, 196 V, 196 W
See application file for complete search history.

(56) References Cited

U.S. PATENT DOCUMENTS

| | | | |
|---|---|---|---|
| 3,094,190 A * | 6/1963 | Conover | 184/6.9 |
| 4,746,130 A | 5/1988 | Abele | |
| 5,070,698 A | 12/1991 | Savidan | |
| 5,575,355 A | 11/1996 | Williams et al. | |
| 5,848,950 A * | 12/1998 | Teraoka et al. | 475/252 |
| 7,040,453 B2 * | 5/2006 | Borcherding | 184/7.1 |
| 7,171,939 B1 * | 2/2007 | Tiller | 123/196 R |
| 7,226,212 B2 * | 6/2007 | Neumann | 384/119 |
| 2009/0217779 A1 * | 9/2009 | Brosowske et al. | 74/411 |

FOREIGN PATENT DOCUMENTS

| | | |
|---|---|---|
| JP | H0552232 U | 7/1993 |
| JP | H0612732 U | 2/1994 |
| JP | 2008008265 A | 1/2008 |

* cited by examiner

*Primary Examiner* — Lindsay Low
*Assistant Examiner* — Charles Brauch
(74) *Attorney, Agent, or Firm* — Liell & McNeil

(57) ABSTRACT

An internal combustion engine includes an engine block defining at least one row of cylinders extending from a first end toward a second end. The internal combustion engine also includes a front housing attached to the first end of the engine block. An idler gear assembly includes an idler gear rotatably mounted on a stub shaft and has a first attachment to the engine block and a second attachment to the front housing. A thrust plate is positioned between the front housing and the idler gear assembly and includes an annular thrust surface, a pair of sealed fastener device openings, and an unsealed lubrication opening.

11 Claims, 5 Drawing Sheets

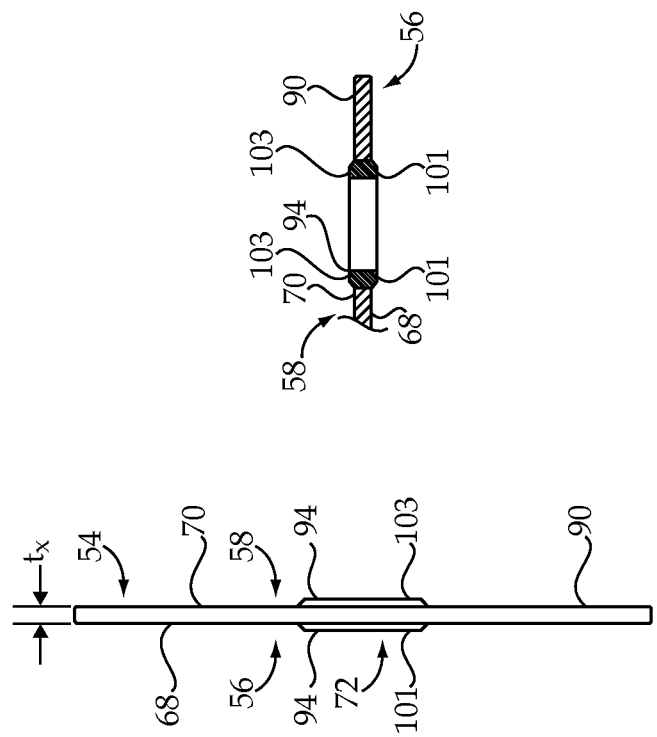
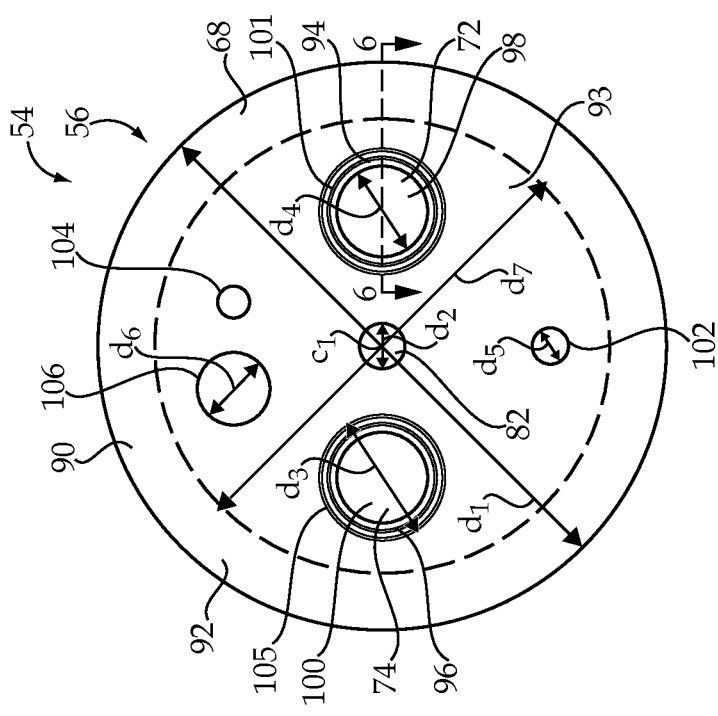

THRUST PLATE FOR AN INTERNAL COMBUSTION ENGINE AND METHOD OF OPERATING SAME

TECHNICAL FIELD

The present disclosure relates generally to a thrust plate for an internal combustion engine, and more particularly to a thrust plate positioned between a front housing and an idler gear assembly.

BACKGROUND

The materials used to manufacture engines, such as internal combustion engines, are generally selected to satisfy specific requirements, such as, for example, meeting technical demands and customer expectations. More recently, however, additional requirements, including environmental compatibility, weight reduction, and cost reduction, are becoming increasingly important. If the requirements for materials change and a new material is identified that better suits the changing demands, the new material will be substituted for the old material. As should be appreciated, the substitution of different materials within the complex engine environment may introduce new issues that were previously unrecognized. For example, if a softer material is substituted for a harder material, the softer material may not provide the wear resistance provided by the harder material. Addressing these new issues, if necessary, may prove challenging in an engine environment where space is already limited.

The present disclosure is directed to one or more of the problems set forth above.

SUMMARY OF THE DISCLOSURE

In one aspect, an internal combustion engine includes an engine block defining at least one row of cylinders extending from a first end toward a second end. The internal combustion engine also includes a front housing attached to the first end of the engine block. An idler gear assembly includes an idler gear rotatably mounted on a stub shaft and has a first attachment to the engine block and a second attachment to the front housing. A thrust plate is positioned between the front housing and the idler gear assembly and includes an annular thrust surface, a pair of sealed fastener device openings, and an unsealed lubrication opening.

In another aspect, a method of operating an internal combustion engine includes driving a gear train that includes an idler gear of an idler gear assembly with the internal combustion engine. An annular thrust surface of a thrust plate is contacted with the idler gear. Lubricating oil is circulated along a stub shaft lubrication passage and through an unsealed lubrication opening of the thrust plate. A first face seal of each of a pair of sealed fastener device openings is compressed with a stub shaft, and a second face seal of each of the sealed fastener device openings is compressed with a front housing.

In yet another aspect, a thrust plate includes a plate defining opposing faces and having a uniform thickness. A first face of the opposing faces includes an annular thrust surface. The plate includes an unsealed lubrication opening and at least one unsealed locating feature opening. The plate also includes a pair of sealed fastener device openings that each include a sealing member attached within a plate opening and having a pair of face seals separated by a distance greater than the uniform thickness of the plate.

BRIEF DESCRIPTION OF THE DRAWINGS

FIG. 4 is a side view of a first side of the thrust plate of FIG. 3, according to another aspect of the present disclosure;

FIG. 5 is an end view of the thrust plate of FIG. 3, according to another aspect of the present disclosure;

FIG. 6 is a cross sectional view taken along lines 6-6 of FIG. 4, according to another aspect of the present disclosure;

DETAILED DESCRIPTION

Figure 1:
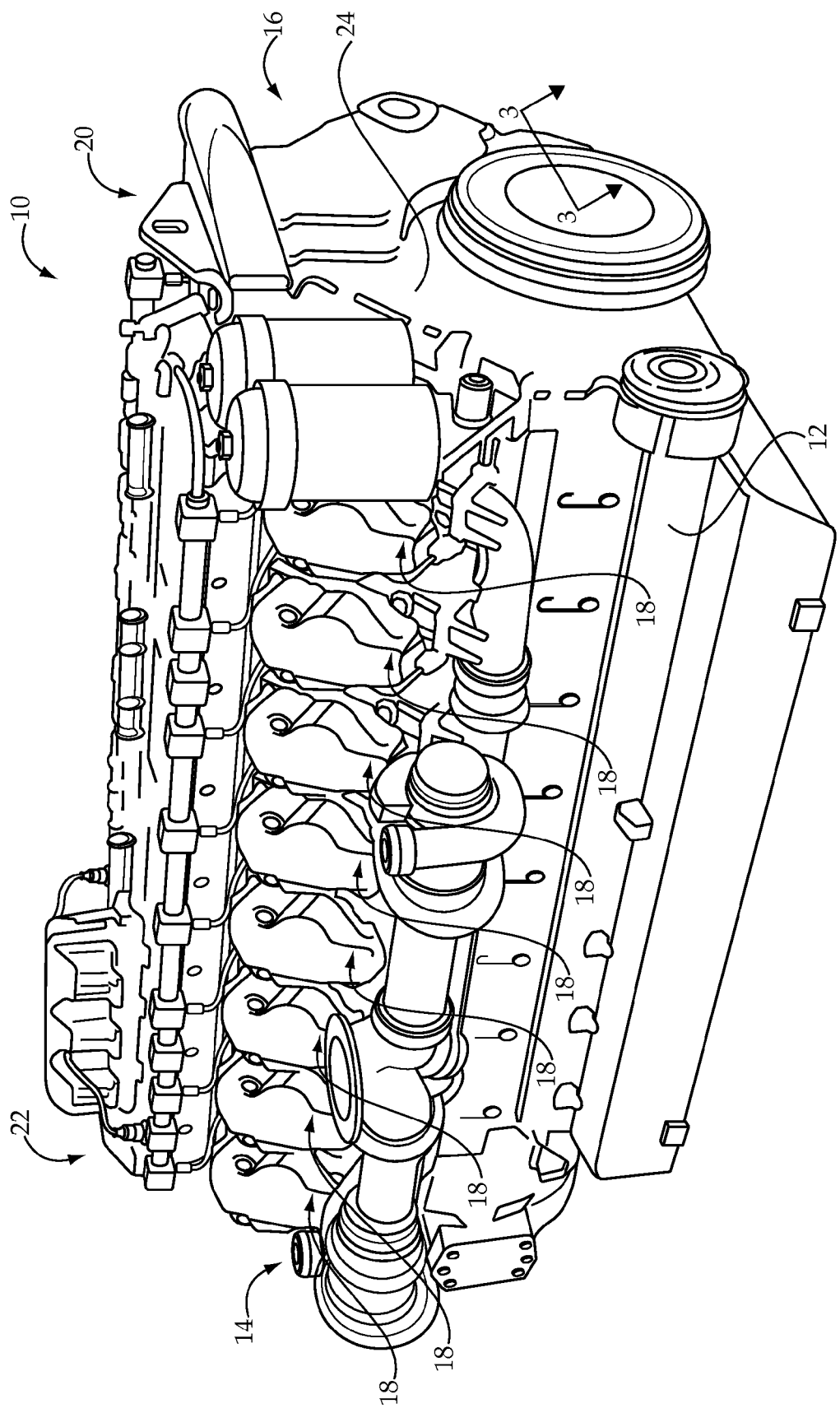
FIG. 1 is a perspective view of an internal combustion engine, according to the present disclosure.

Referring to FIG. 1, an exemplary embodiment of an internal combustion engine 10 according to the present disclosure is shown. The internal combustion engine 10 generally includes an engine block 12 defining a first row 14 and a second row 16 of cylinders 18. The rows 14 and 16 of cylinders 18 extend from a first end 20 of the engine block 12 toward a second end 22. Although a specific number of cylinders 18 are shown arranged in a V orientation, it should be appreciated that any number of cylinders may be provided in one or two rows and may have various angles of orientation. Such design specifications may vary depending on a particular application. It should be appreciated that such engines may be used in on-highway or off-highway machine applications, marine applications, or power generation applications.

Figure 2:
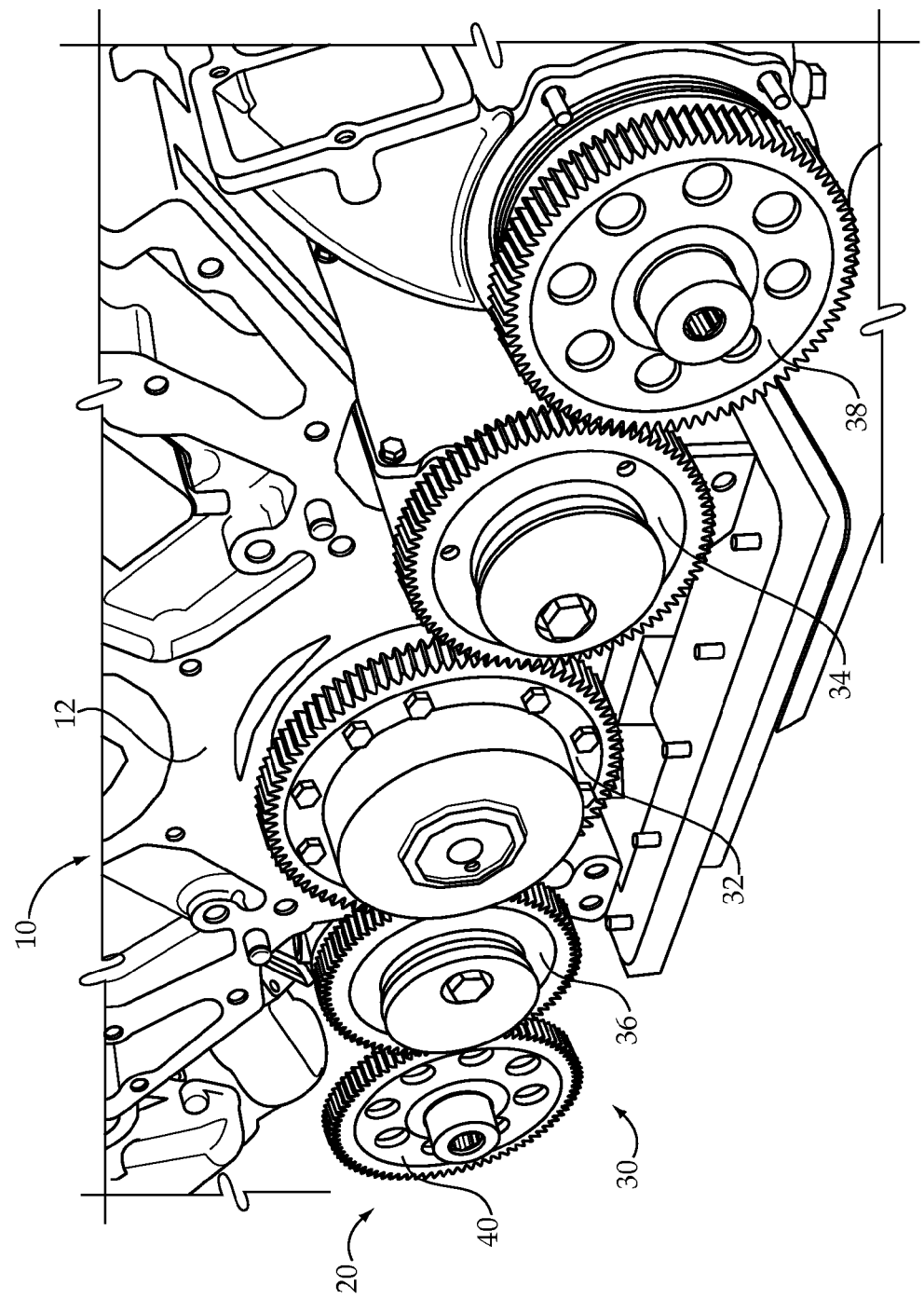
FIG. 2 is a perspective view of an end of the internal combustion engine of FIG. 1 with components removed to expose a gear train, according to one aspect of the present disclosure.

A front housing 24 is attached to the first end 20 of the engine block 12 using known attachment means. The front housing 24 may be a casting made from a relatively soft material, such as a soft metal or alloy, including aluminum or the like. The front housing 24 may house or support, at least partially, a gear train 30, shown in FIG. 2 (with the front housing 24 and additional components removed). The gear train 30 may include a crank gear 32, which may be driven by a crankshaft (not shown), meshed to drive rotation of a pair of idler gears 34 and 36. The power transmitted from the crank gear 32 may be transferred through the idler gears 34 and 36 to drive rotation of auxiliary pump drives 38 and 40. As should be appreciated, the gear train 30 may include any number of gears that drive rotation of various engine components and accessories, such as, for example, hydraulic, water, and lubricating oil pumps.

Figure 3:
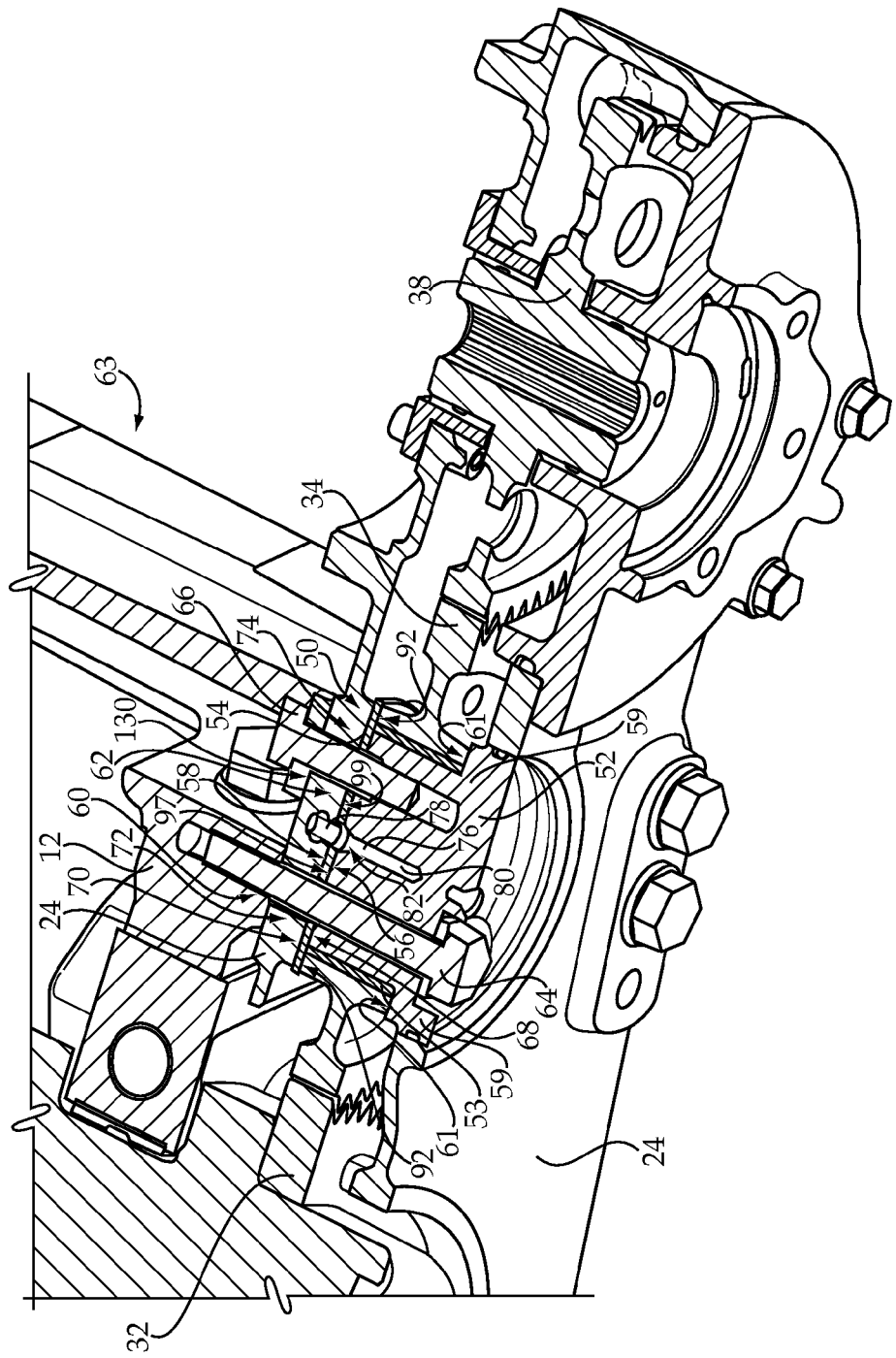
FIG. 3 is a cross sectional view taken along lines 3-3 of FIG. 1, according to another aspect of the present disclosure.

Turning now to FIG. 3, a cross sectional view taken along lines 3-3 of FIG. 1 is shown. Specifically, an idler gear assembly 50, including the idler gear 34, is shown, along with the auxiliary pump drive 38. The idler gear assembly 50 generally includes the idler gear 34 rotatably mounted on a stub shaft 52. According to a specific embodiment, a bearing sleeve 53 may be press fit within a bore of the idler gear 34 and may be configured to turn on the fixed stub shaft 52. A thrust plate 54 is positioned between the front housing 24 and the idler gear assembly 50. The thrust plate 54, which will be discussed later in greater detail, includes an annular thrust surface 92, discussed below, and is positioned to contact the idler gear 34 and stub shaft 52 on a first side 56 and contact the front housing 24 on a second side 58. Thus, according to the exemplary embodiment, the thrust plate 54 does not contact the engine block 12. Flanges 59 of the stub shaft 52 also include a thrust surface 61, which may receive thrust contact from the idler gear 34.

As shown, the idler gear assembly 50 may be positioned at a side 63 of the engine block 12. According to the exemplary embodiment, the idler gear assembly 50 may include a first attachment 60 to the engine block 12 and a second attachment 62 to the front housing 24. For example, a first threaded fastener device 64 may be threaded into the engine block 12, while a second threaded fastener device 66 may be threaded into the stub shaft 52. Specifically, external threads of the first and second threaded fastener devices 64 and 66 may engage internal threads of fastener bores within the engine block 12 and stub shaft 52, respectively. As shown, the pair of threaded fastener devices 64 and 66 may enter through opposing faces 68 and 70, respectively, of the thrust plate 54 and are positioned through sealed fastener device openings 72 and 74, respectively, of the thrust plate 54. Fastener devices 64 and 66 may include any known fastening devices, including bolts, screws, and the like. Further, an "attachment," as used herein, is used generally to describe a means of affixing, joining, connecting, or holding in contact two or more components.

Lubrication is provided to the idler gear assembly 50 along a stub shaft lubrication passage 76. Specifically, an upstream segment 78 of the stub shaft lubrication passage 76, which receives lubricating oil from an oil supply, is fluidly connected to a downstream segment 80 of the stub shaft lubrication passage 76, which is positioned within the stub shaft 52, through an unsealed lubrication opening 82 of the thrust plate 54. Lubricating oil will also be supplied to the idler gear 34 from the upstream segment 78 of the stub shaft lubrication passage 76 along a radial lubrication passage 84, shown in FIG. 8, of the stub shaft 52. Although not shown, a lubrication system may include an oil pump for circulating lubricating oil through a plurality of lubrication oil galleries defined by the engine block 12. A number of additional passages, including the stub shaft lubrication passage 76, are fluidly connected to the lubrication system and may direct lubricating oil to different components of the engine requiring lubrication.

Turning now to FIG. 4, a side view of the thrust plate 54 is shown. In particular, the first side 56 of the thrust plate 54, including opposing face 68, is shown. The thrust plate 54 generally includes a plate 90 having an annular thrust surface 92 for receiving thrust contact from the idler gear 34. The plate 90 may have a uniform thickness, as shown in FIG. 5, such as an axial thickness tx of between about 2.75 millimeters (mm) and about 3.25 mm, and may have a diameter $d_1$ of between about 105 mm and about 110 mm. According to a specific embodiment, the thrust plate 54 may be about 3 mm thick and may have a diameter $d_1$ of about 107 mm. Although a circular plate 90 is shown, it should be appreciated that the plate 90 may have various shapes, depending on the space available and other manufacturing constraints. Although the plate 90 may be made from various materials having differing chemistries, it should be appreciated that a relatively hard material, such as a metal or alloy, including iron or steel, may be preferred. For example, the selected material should be capable of sufficiently withstanding thrust contact by the idler gear 34.

According to a specific embodiment, the thrust plate 54 may be carbonitrided, to increase the surface hardness of the plate 90 and minimize distortion that may be caused by thrust contact from the idler gear 34. As should be appreciated, alternative or additional heat treatment processes may be used to increase the surface hardness. Further, according to a specific embodiment, the annular thrust surface 92 may have a first surface finish, and may surround a stub shaft engagement surface 93 that has a second surface finish. For example, according to a specific dual surface finish of first side 56, the stub shaft engagement surface 93 may have a surface roughness of about 6-10 microns to maximize friction at the bolted joints, while the annular thrust surface 92 may have a surface roughness of about 0.8 microns to minimize scuffing potential along on the thrust surface. According to the exemplary embodiment, the stub shaft engagement surface 93 may have a diameter $d_7$ of about 84 mm, with the annular thrust surface 92 representing the remaining surface area of face 68. As should be appreciated, these values are provided as examples only, according to a specific embodiment, and may vary depending on alternative applications. Further, due to cost and manufacturing constraints, such treatments and/or surface finishes may not be provided.

The unsealed lubrication opening 82, introduced above, may be positioned at or near a center $C_1$ of the plate 90 and may have a diameter $d_2$ of between about 7 mm and about 11 mm, or may preferably be about 9 mm, according to the exemplary embodiment. The unsealed lubrication opening 82 fluidly connects an oil supply to the idler gear assembly 50. More specifically, the unsealed lubrication opening 82 may fluidly connect the upstream segment 78 of the stub shaft lubrication passage 76 with the downstream segment 80 of the stub shaft lubrication passage 76, as shown in FIG. 3. As should be appreciated, an "unsealed" opening, as used herein, means an opening that does not include a sealing member positioned or attached therein.

The thrust plate 54, or plate 90, also includes the pair of sealed fastener device openings 72 and 74 sized and configured to receive the respective fastener devices 64 and 66 therethrough. The sealed fastener device openings 72 and 74 include sealing members 94 and 96, which may be made from an elastomer, such as rubber, or other suitable material, attached within plate openings 98 and 100. For example, the sealing members 94 and 96 may be chemically or mechanically bonded, or otherwise attached, within the plate openings 98 and 100. The pair of sealed fastener device openings 72 and 74 may have an unsealed diameter $d_3$, which may represent the diameter of plate openings 98 and 100 without the sealing members 94 and 96, of between about 19 mm and about 23 mm, and a sealed diameter $d_4$, including the sealing members 94 and 96, of between about 15 mm and about 20 mm. According to a specific embodiment, the sealed fastener device openings 72 and 74 may have an unsealed diameter $d_3$ of about 20.9 mm and a sealed diameter $d_4$ of about 17.4 mm.

Figure 7:
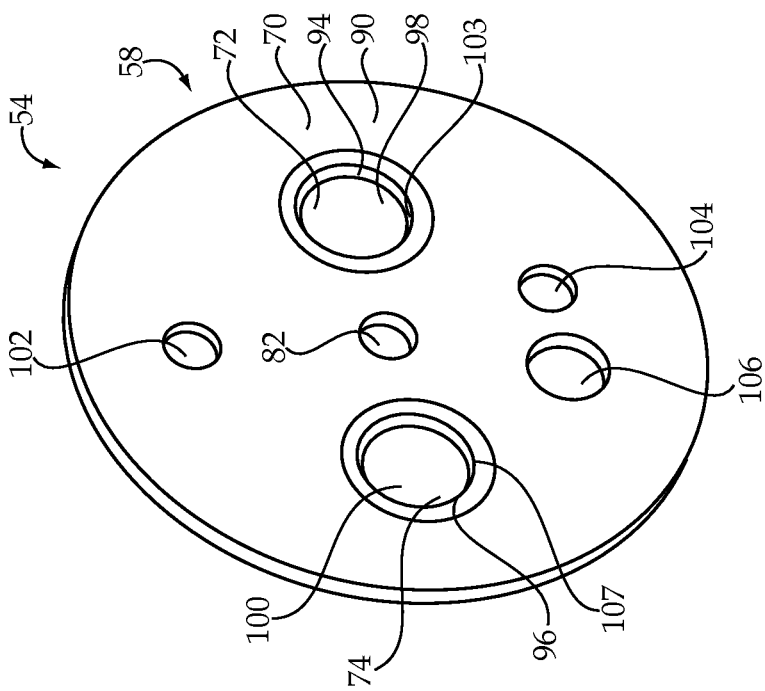
FIG. 7 is a perspective view of a second side of the thrust plate of FIG. 3, according to another aspect of the present disclosure.

Referring also to the second side 58 of the thrust plate 54, as shown in FIG. 7, sealing member 94 includes a pair of face seals 101 and 103, while sealing member 96 includes a pair of face seals 105 and 107. The face seals in each pair 101, 103 and 105, 107 may be separated by a distance greater than the thickness tx of the plate 90 and may extend outwardly from the opposing faces 68 and 70 of the plate 90, as shown in FIG. 5. More specifically, face seals 101 and 105 may extend outward from the opposing face 68, while face seals 103 and 107 may extend outward from the opposing face 70. When the relevant portions of the internal combustion engine 10 are assembled, the face seals 101 and 105 extending from face 68 are deformed inwardly toward the plate 90 by the stub shaft 52, while the face seals 103 and 107 extending from face 70 are deformed inwardly toward the plate 90 by the front housing 24. The sealing members 94 and 96 may have cross sections as shown in the cross sectional view of sealing member 94 depicted in FIG. 6. Specifically, the generally circular shape may be chosen to minimize the land necessary to form a seal with the face seals 101, 103 and 105, 107.

Seals are formed on the first side 56 of the thrust plate 54 around the sealed fastener device openings 72 and 74 when respective face seals 101 and 105 are compressed by a sealing face 97 of the stub shaft 52. Similarly, seals are formed on the second side 58 of the thrust plate 54 around the sealed fastener device openings 72 and 74 when face seals 103 and 107 are compressed by a sealing face 99 of the front housing 24. As should be appreciated, the sealing members 94 and 96 include pairs of face seals 101, 103 and 105, 107, respectively, as distinguished from radial seals. As such, there may remain some clearance between the fastener devices 64 and 66 and the sealing members 94 and 96, even in a compressed state of the face seals 101, 103 and 105, 107.

According to the exemplary embodiment, the sealed fastener device openings 72 and 74 are positioned on opposing sides of the unsealed lubrication opening 82. Further, the sealed fastener device openings 72 and 74 and the unsealed lubrication opening 82 may all be positioned through the stub shaft engagement surface 93, and a distance between each of the sealed fastener device openings 72 and 74 and the unsealed lubrication opening 82 may be less than about 20 mm. This close proximity of the sealed fastener device openings 72 and 74 to the unsealed lubrication opening 82, as dictated by the particular engine application, may preclude the use of counterbores for securing sealing members 94 and 96 relative to plate openings 98 and 100. As such, none of the opposing faces 68 and 70 of the thrust plate 54, the sealing face 97 of the stub shaft 52, and the sealing face 99 of the front housing 24 require counterbores, according to the current disclosure.

The thrust plate 54 also includes at least one unsealed locating feature opening. According to the exemplary embodiment, the thrust plate 54 may include three unsealed locating feature openings 102, 104, 106 through the plate 90. Two of the unsealed locating feature openings 102 and 104 may have a diameter $d_5$ of between about 4 mm and about 8 mm, or more preferably about 6 mm, while a third unsealed locating feature opening 106 may have a diameter $d_6$ of between about 12 mm and about 16 mm, or more preferably about 14 mm. The unsealed locating feature openings 102, 104, and 106, which may be used during assembly, are discussed in greater detail below.

As shown, a distribution of the sealed fastener device openings 72 and 74, the unsealed lubrication opening 82, and the unsealed locating feature openings 102, 104, and 106 about the opposing faces 68 and 70 of the thrust plate 54 is asymmetrical. Therefore, it is not envisioned that the distribution of the openings be symmetrical and, as such, care must be taken during assembly to ensure the thrust plate 54 is positioned correctly. Further, because the first side 56, or face 68, may be provided with a dual surface finish, as described above, care must be taken to ensure that the thrust plate 54 is positioned such that the first side 56, including the dual surface finish, contacts the stub shaft 52.

Figure 8:
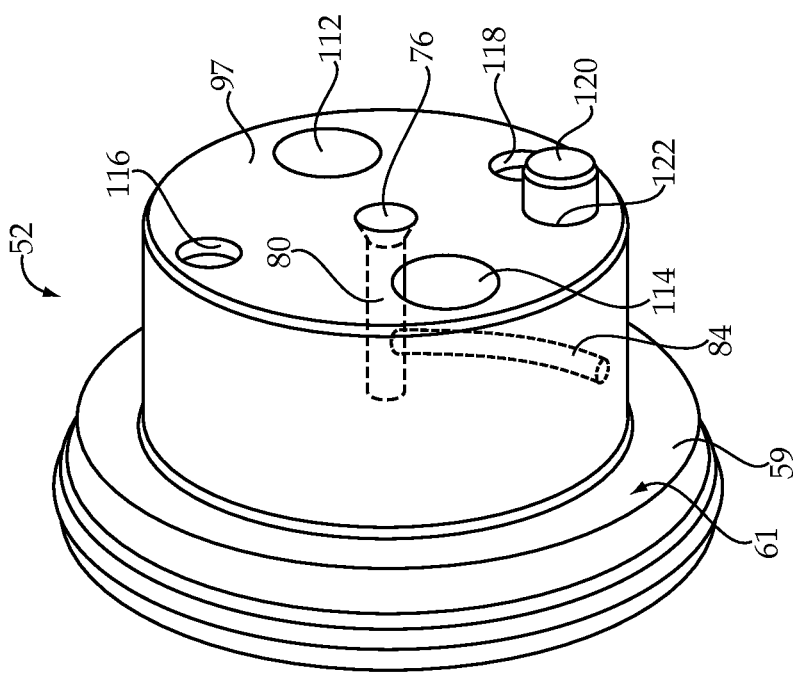
FIG. 8 is a perspective view of the stub shaft of FIG. 3, according to one aspect of the present disclosure.

Turning now to FIG. 8, the stub shaft 52 may include a central bore 110 that defines the stub shaft lubrication passage 76 or, more specifically, the downstream segment 80 of the stub shaft lubrication passage 76. When assembled, the central bore 110 substantially aligns with the unsealed lubrication opening 82 of the thrust plate 54, with the first side 56 of the thrust plate 54 facing the stub shaft 52, such that the downstream segment 80 of the stub shaft lubrication passage 76 is fluidly connected to the upstream segment 78 of the stub shaft lubrication passage 76. Radial lubrication passage 84 is used to supply lubricating oil to the idler gear 34 from the upstream segment 78 of the stub shaft lubrication passage 76. The stub shaft 52 may also include holes 112 and 114 for receiving threaded fastener devices 64 and 66, respectively. As should be appreciated, hole 112 may extend entirely through the stub shaft 52, while hole 114 may extend only partially through the stub shaft 52 and may include internal threads for engaging external threads of the threaded fastener device 66. When assembled, hole 112 substantially aligns with the sealed fastener device opening 72, while hole 114 substantially aligns with the sealed fastener device opening 74.

The stub shaft 52 may also include a plurality of locating feature openings. According to the exemplary embodiment, the stub shaft 52 may include first and second locating feature openings 116 and 118 that are positioned to align with the unsealed locating feature openings 102 and 104 of the thrust plate 54. For example, spring pins, or other locating features, may have first ends secured within openings of the front housing 24 and second ends extending from the surface of the front housing. The thrust plate 54 may then be positioned at its proper location in contact with the front housing 24 such that the spring pins provided are positioned through the locating feature openings 102 and 104 and extend outward beyond face 68 of the thrust plate 54. The stub shaft 52, including idler gear assembly 50, may then be positioned at its proper location in contact with the thrust plate 54 by positioning the spring pins within the locating feature openings 116 and 118.

A further locating feature, dowel 120, may be positioned within an additional locating feature opening 122 of the stub shaft 52 to assist with alignment of the threaded fastener devices 64 and 66. For example, during assembly, the stub shaft 52 may be positioned such that the locating feature opening 122 substantially aligns with the unsealed locating feature openings 106 of the thrust plate 54 and the dowel 120 is positioned, at least partially, within the unsealed locating feature opening 106. This may assist in maintaining alignment of the fastener device openings, including hole 112 with opening 72 and hole 114 with opening 74, while fastening the fastener devices 64 and 66. As should be appreciated, alternative locating features, which may include dowels, spring pins, or other similar devices, may be used to ensure the thrust plate 54 and stub shaft 52 are properly aligned and held in place for receiving the threaded fastener devices 64 and 66 blindly during assembly.

As should be appreciated, the sealing members 94 and 96 of the sealed fastener device openings 72 and 74 function to reduce leakage from the stub shaft lubrication passage 76 at the sealed fastener device openings 72 and 74. Specifically, the sealing member 94 receiving the first threaded fastener device 64 reduces leakage from the stub shaft lubrication passage 76, along the thrust plate 54, and through the hole 112 of the stub shaft 52 to the outside of the engine 10. The sealing member 96 receiving the second threaded fastener device 66 reduces leakage from the stub shaft lubrication passage 76, along the thrust plate 54, and through the hole 130 of the front housing 24 (shown in FIG. 3) to the outside of the engine 10.

INDUSTRIAL APPLICABILITY

The present disclosure may be applicable to internal combustion engines having an engine component made from a relatively soft material that may be positioned to receive thrust contact from another engine component. Further, the present disclosure may be applicable to such an interface that may also experience lubricating oil leakage. Yet further, the present disclosure may be particularly applicable to such a thrust contact interface that exhibits lubricating oil leakage and has significant space limitations.

Referring generally to FIGS. 1-8, an internal combustion engine 10 may include an engine block 12 defining at least one row 14, 16 of cylinders 18 extending from a first end 20 toward a second end 22. The internal combustion engine 10 may also include a front housing 24 attached to the first end 20 of the engine block 12. An idler gear assembly 50 includes an idler gear 34 rotatably mounted on a stub shaft 52 and has a first attachment 60 to the engine block 12 and a second attachment 62 to the front housing 24. A thrust plate 54 is positioned between the front housing 24 and the idler gear assembly 50 and has a first side 56 that includes an annular thrust surface 92.

According to a specific attachment arrangement, a first threaded fastener device 64 may be threaded into the engine block 12, while a second threaded fastener device 66 may be threaded into the stub shaft 52. The pair of threaded fastener devices 64 and 66 may enter through opposing faces 68 and 70, respectively, of the thrust plate 54 and may be positioned through sealed fastener device openings 72 and 74, respectively, of the thrust plate 54. The sealed fastener device openings 72 and 74 include sealing members 94 and 96 attached within plate openings 98 and 100 of the plate 90. Face seals 101 and 103 of sealing member 94 and face seals 105 and 107 of sealing member 96 are deformed inwardly toward the thrust plate 54, by the front housing 24 and the stub shaft 52, such that the front housing 24 contacts both the thrust plate 54 and the sealing members 94 and 96, and the stub shaft 52 contacts both the thrust plate 54 and the sealing members 94 and 96. More specifically, the first side 56 of the thrust plate 54 and the face seals 101 and 105 are contacted with the stub shaft 52, while the second side 58 of the thrust plate 54 and face seals 103 and 107 are contacted with the front housing 24.

During operation of the internal combustion engine 10, a gear train 30, housed at least partially within the front housing 24, may be driven by the internal combustion engine 10. The gear train 30 may include a crank gear 32 in mesh with the idler gear 34 for rotatably driving the idler gear 34. As a result of the normal operation and transmission of power, a force acting on the idler gear 34 may cause it to move out of a plane defined by the gear 34 and contact the annular thrust surface 92 of the thrust plate 54. The thrust plate 54 may be made from a relatively hard metal or alloy and may reduce wear of the front housing 24, which may be made from a relatively soft metal or alloy. Specifically, the thrust plate 54 may protect the front housing 24 from contact with the idler gear 34. If necessary, due to extreme wear, the thrust plate 54 may be replaced, precluding the need to replace the front housing 24.

Also during operation of the internal combustion engine 10, lubricating oil may be circulated throughout the engine 10, including along a stub shaft lubrication passage 76. This may include circulating the lubricating oil through an unsealed lubrication opening 82 of the thrust plate 54. As shown, the unsealed lubrication opening 82 fluidly connects an upstream segment 78 of the stub shaft lubrication passage 76 with a downstream segment 80 of the stub shaft lubrication passage 76. To reduce leakage that may occur from lubricating oil weeping out along the fastener devices 64 and 66, seals are formed on the first side 56 of the thrust plate 54 around the sealed fastener device openings 72 and 74 when respective face seals 101 and 105 are compressed by a sealing face 97 of the stub shaft 52. Similarly, seals are formed on the second side 58 of the thrust plate 54 around the sealed fastener device openings 72 and 74 when face seals 103 and 107 are compressed by a sealing face 99 of the front housing 24.

The thrust plate 54, made from a relatively hard material, protects the soft housing 24, which may be made from aluminum, from increased wear resulting from thrust contact by the idler gear 34. Further, the integral seals 94 and 96 of the thrust plate 54 reduce leakage of lubricating oil, supplied to the idler gear assembly 50, at the two attachment locations 60 and 62 of the idler gear assembly 50 to the engine block 12 and front housing 24. By integrating sealing members 94 and 96 with the thrust plate 54, the need for counterbores and o-rings or sealing washers at an area where space is limited and blind assembly is necessary is avoided. Further, by integrating the sealing members 94 and 96 with the thrust plate 54, when the thrust plate 54 is installed correctly it can be assumed with a high level of certainty that the sealing members 94 and 96 are positioned correctly.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

The invention claimed is:

1. An internal combustion engine, including:
an engine block defining at least one row of cylinders, the row extending from a first end toward a second end;
a front housing attached to the first end;
an idler gear assembly having an idler gear rotatably mounted on a stub shaft, the idler gear assembly having a first attachment to the engine block and a second attachment to the front housing;
a thrust plate positioned between the front housing and the idler gear assembly and including an annular thrust surface, a pair of sealed fastener device openings, and an unsealed lubrication opening; and
a pair of threaded fastener devices entering through the opposing faces of the thrust plate and positioned through the sealed fastener device openings,
wherein a first threaded fastener device is threaded into the engine block and a second threaded fastener device is threaded into the stub shaft, wherein a first face of opposing faces of the thrust plate includes the annular thrust surface, and, during operation of the internal combustion engine, the idler gear contacts the annular thrust surface, wherein each of the sealed fastener device openings includes a sealing member attached within a plate opening and including a pair of face seals separated by a distance greater than a uniform thickness of the thrust plate, and wherein the front housing is a relatively soft material and the thrust plate is a relatively hard material.

2. The internal combustion engine of claim 1, wherein the pair of face seals of each sealing member includes a first face seal that is deformed inwardly toward the thrust plate by the stub shaft, and a second face seal that is deformed inwardly toward the thrust plate by the front housing.

3. The internal combustion engine of claim 1, wherein the unsealed lubrication opening fluidly connects an upstream segment of a stub shaft lubrication passage with a downstream segment of the stub shaft lubrication passage.

4. The internal combustion engine of claim 1, wherein the thrust plate further includes at least one unsealed locating feature opening.

5. The internal combustion engine of claim 4, wherein a distribution of the sealed fastener device openings, the unsealed lubrication opening, and the unsealed locating feature opening about the opposing faces of the thrust plate is asymmetrical.

6. The internal combustion engine of claim 1, further including a gear train, wherein the gear train includes a crank gear in mesh with the idler gear.

7. A thrust plate, including:
a plate defining opposing faces and having a uniform thickness, wherein a first face of the opposing faces includes an annular thrust surface;
an unsealed lubrication opening through the plate;
a pair of sealed fastener device openings through the plate, wherein each of the sealed fastener device openings includes an integral sealing member bonded within a plate opening and having a pair of face seals separated by a distance greater than the uniform thickness of the plate; and
at least one unsealed locating feature opening through the plate,
wherein the plate is circular, and wherein the annular thrust surface surrounds a stub shaft engagement surface, wherein the unsealed lubrication opening and the sealed fastener device openings are positioned through the stub shaft engagement surface, wherein a distance between each of the sealed fastener device openings and the unsealed lubrication opening is less than about 20 mm.

8. A thrust plate, including:
a plate defining opposing faces and having a uniform thickness, wherein a first face of the opposing faces includes an annular thrust surface;
an unsealed lubrication opening through the plate;
a pair of sealed fastener device openings through the plate, wherein each of the sealed fastener device openings includes an integral sealing member bonded within a plate opening and having a pair of face seals separated by a distance greater than the uniform thickness of the plate; and
at least one unsealed locating feature opening through the plate wherein the plate is circular, wherein a distribution of the sealed fastener device openings, the unsealed lubrication opening, and the unsealed locating feature opening about the opposing faces of the thrust plate is asymmetrical.

9. The thrust plate of claim 8, wherein the plate has an axial thickness of between about 2.75 mm and about 3.25 mm and a diameter of between about 105 mm and about 110 mm.

10. The thrust plate of claim 9, wherein the unsealed lubrication opening is positioned at a center of the plate and has a diameter of between about 7 mm and about 11 mm.

11. The thrust plate of claim 10, wherein the pair of sealed fastener device openings have an unsealed diameter of between about 19 mm and about 23 mm, and a sealed diameter of between about 15 mm and about 20 mm.

* * * * *